United States Patent
Chandra et al.

(10) Patent No.: US 12,132,166 B2
(45) Date of Patent: Oct. 29, 2024

(54) STACKED SOLID STATE BATTERIES AND METHODS OF MAKING THE SAME

(71) Applicants: Aditi Chandra, Los Gatos, CA (US); Richard Van Der Linde, San Jose, CA (US); Paul Butler, San Jose, CA (US); Mao Ito, Santa Cruz, CA (US); Jonathon Y. Simmons, San Jose, CA (US); Miki Trifunovic, San Jose, CA (US); Alex Yan, San Jose, CA (US); Arvind Kamath, Los Altos, CA (US); Shoba Rao, San Jose, CA (US)

(72) Inventors: Aditi Chandra, Los Gatos, CA (US); Richard Van Der Linde, San Jose, CA (US); Paul Butler, San Jose, CA (US); Mao Ito, Santa Cruz, CA (US); Jonathon Y. Simmons, San Jose, CA (US); Miki Trifunovic, San Jose, CA (US); Alex Yan, San Jose, CA (US); Arvind Kamath, Los Altos, CA (US); Shoba Rao, San Jose, CA (US)

(73) Assignee: Ensurge Micropower ASA, Oslo (NO)

( * ) Notice: Subject to any disclaimer, the term of this patent is extended or adjusted under 35 U.S.C. 154(b) by 0 days.

(21) Appl. No.: 17/185,122

(22) Filed: Feb. 25, 2021

(65) Prior Publication Data

US 2021/0320323 A1 Oct. 14, 2021

Related U.S. Application Data

(60) Provisional application No. 63/009,173, filed on Apr. 13, 2020.

(51) Int. Cl.
*H01M 10/0562* (2010.01)
*H01M 10/0583* (2010.01)
(Continued)

(52) U.S. Cl.
CPC ... *H01M 10/0562* (2013.01); *H01M 10/0583* (2013.01); *H01M 10/0585* (2013.01); *H01M 50/178* (2021.01); *H01M 50/547* (2021.01)

(58) Field of Classification Search
CPC ......... H01M 10/0562; H01M 10/0583; H01M 10/0585; H01M 10/0459; H01M 10/04; H01M 50/178; H01M 50/547
See application file for complete search history.

(56) References Cited

U.S. PATENT DOCUMENTS

| 6,982,132 B1 * | 1/2006 | Goldner | ............ H01M 10/0585 29/623.5 |
| 2002/0071989 A1 * | 6/2002 | Verma | .................... H01M 50/11 29/623.5 |

(Continued)

FOREIGN PATENT DOCUMENTS

WO WO-2020158884 A1 * 8/2020 ............ C09J 157/00

*Primary Examiner* — Matthew T Martin
*Assistant Examiner* — Adam J Francis
(74) *Attorney, Agent, or Firm* — Andrew D. Fortney; Central California IP Group, P.C.

(57) ABSTRACT

A solid-state battery and a method of making the same are disclosed. The battery includes a base frame or support, first and second exterior contacts on the base frame/support, stacked solid-state battery unit cells, first and second electrical connections, and encapsulation in contact with the base frame/support and covering the solid-state battery unit cells and the electrical connections. Each stacked solid-state battery unit cell is on a metal substrate and has exposed cathode and anode current collectors. The electrical connections respectively electrically connect the exposed cathode and anode current collectors to the first and second exterior contacts. The method includes forming the stacked solid-state battery unit cells on the base frame/support, forming the exterior contacts on the base frame/support, electrically connecting the exposed cathode and anode current collectors (Continued)

to the respective exterior contacts, and encapsulating the solid-state battery unit cells and the electrical connections.

20 Claims, 12 Drawing Sheets

(51) Int. Cl.
*H01M 10/0585* (2010.01)
*H01M 50/178* (2021.01)
*H01M 50/547* (2021.01)

(56) References Cited

U.S. PATENT DOCUMENTS

| | | | |
|---|---|---|---|
| 2004/0009334 A1* | 1/2004 | Miyamoto | H01M 10/0413 428/209 |
| 2007/0139001 A1* | 6/2007 | Hahn | H01M 10/0565 320/112 |
| 2011/0070480 A1* | 3/2011 | Hahn | H01M 50/11 29/623.5 |
| 2011/0183183 A1* | 7/2011 | Grady | H01M 6/40 429/162 |
| 2013/0341205 A1* | 12/2013 | Baba | H01M 10/052 205/656 |
| 2015/0280201 A1* | 10/2015 | Bhardwaj | H01M 50/528 429/160 |
| 2015/0325862 A1* | 11/2015 | Song | C23C 14/34 118/620 |
| 2015/0364788 A1* | 12/2015 | Lu | C23C 14/28 427/596 |
| 2018/0315979 A1* | 11/2018 | Ryu | H01M 50/548 |
| 2019/0089023 A1* | 3/2019 | Sastry | H01M 50/269 |
| 2021/0359286 A1* | 11/2021 | Matsuki | C09J 7/35 |

* cited by examiner

STACKED SOLID STATE BATTERIES AND METHODS OF MAKING THE SAME

CROSS REFERENCE TO RELATED APPLICATION(S)

This application claims the benefit of U.S. Provisional Patent Application No. 63/009,173, filed on Apr. 13, 2020, incorporated herein by reference as if fully set forth herein.

FIELD OF THE INVENTION

The present invention generally relates to the field of solid-state batteries. More specifically, embodiments of the present invention pertain to stacked, multi-cell solid-state batteries and methods of making the same.

DISCUSSION OF THE BACKGROUND

Solid-state lithium batteries (SSLBs) are thin film devices that typically have a size or area of approximately 1-100 cm$^2$ and a capacity in the range of 0.1-100 mAh. However, many applications in healthcare and for wearable electronics require a footprint (area) that is smaller than 1 cm$^2$.

One way to achieve a capacity in the above range with a smaller footprint is to stack multiple smaller batteries vertically and electrically connect them to create one device. Battery stacking is known, but none of the methods are suitable for thin film solid-state batteries fabricated on conductive or insulator-encapsulated substrates. Most known die stacking concepts are appropriate for thin film devices on purely insulating substrates (e.g., glass, silicon, ceramics, plastics) or for non-solid-state batteries (Li-ion, etc.).

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to printed and/or thin film electronic devices, more specifically stacked solid-state and thin film batteries. Embodiments of the present invention pertain to stacked batteries having a flexible and/or conductive substrate, and methods of manufacturing the same.

In one aspect, the present invention relates to a solid-state battery, comprising a base frame or support, first and second exterior contacts on the base frame or support, a plurality of stacked solid-state battery unit cells, first and second electrical connections, and encapsulation in contact with the base frame or support and covering the plurality of solid-state battery unit cells and the first and second electrical connections. Each of the stacked solid-state battery unit cells is on a metal substrate and has an exposed cathode current collector and an exposed anode current collector. The first and second electrical connections respectively electrically connect the exposed cathode current collectors and the exposed anode current collectors to the first and second exterior contacts.

In some embodiments, the battery may further comprise sidewall insulation between each of the first and second electrical connections and the solid-state battery unit cells, including the metal substrates. In other or further embodiments, each of the first and second electrical connections comprises a stretchable conductive material or a serpentine conductive structure.

In some embodiments, each of the plurality of solid-state battery unit cells is offset from the other solid-state battery unit cells. Alternatively, the solid-state battery unit cells may be vertically stacked without offset. In such alternative embodiments, a lowermost one of the solid-state battery unit cells is electrically connected to the first and second exterior contacts, a next lowermost one of the solid-state battery unit cells includes a first cutout along an edge of the corresponding exposed cathode current collector and a second cutout along an edge of the corresponding exposed anode current collector, and the first and second electrical connections are respectively in the first and second cutouts.

The present battery also allows for more than two unit cells. For example, a third solid-state battery unit cell may be on the next lowermost solid-state battery unit cell, and the third solid-state battery unit cell may include a third cutout along an edge of the corresponding exposed cathode current collector and a fourth cutout along an edge of the corresponding exposed anode current collector. In such examples, the first and second electrical connections of the third solid-state battery unit cell are respectively in the third and fourth cutouts. Thus, in general, successive solid-state battery unit cells are stacked on the next lowermost solid-state battery unit cell, and the successive solid-state battery unit cells may include increasingly larger cutouts along edges of the corresponding exposed and anode cathode current collectors in stacking succession. The first and second electrical connections of each successive solid-state battery unit cell may be in the increasingly larger cutouts. The present battery may comprise from 2 to 20 solid-state battery unit cells. In more typical examples, the battery comprises from 3 to 10 solid-state battery unit cells, and more ideally, from 4 to 8 solid-state battery unit cells.

In some embodiments, the battery further comprises a flexible stacking substrate to which the solid-state battery unit cells, including the metal substrates, are affixed or secured. In such embodiments, the battery may further comprise first and second electrodes on the flexible stacking substrate, in which case each of the exposed cathode current collectors may be in ohmic contact with the first electrode, and each of the exposed anode current collectors may be in ohmic contact with the second electrode. Alternatively or additionally, in such embodiments, each of the exposed cathode and anode current collectors may be respectively electrically connected to the first and second electrodes with solder, and the battery may further comprise underfill between each of the solid-state battery unit cells and the flexible stacking substrate. In some further embodiments, the battery may further comprise first and second wire bonds respectively electrically connecting the first and second electrodes to the first and second exterior contacts.

In various embodiments, the flexible stacking substrate may be folded onto itself in the stacked solid-state battery unit cells. In such embodiments, adjacent solid-state battery unit cells may be face-to-face or back-to-back, although adjacent battery unit cells may be face-to-face or back-to-back in other embodiments as well.

In some embodiments, the battery may further comprise first and second interior contacts on the same major surface of the base frame or support as the solid-state battery unit cells. In such embodiments, the battery may further comprise first and second through-vias respectively electrically connecting the first and second interior contacts to the first and second exterior contacts.

In various embodiments, each of the solid-state battery unit cells may comprise a cathode current collector layer, a cathode, a solid-phase electrolyte, and an anode current collector layer. The cathode current collector layer may be on the respective metal substrate and continuous with the exposed cathode current collector, the cathode may be on or over the cathode current collector, the solid-phase electrolyte may be on or over the respective cathode, and the anode current collector layer may be on or over the respective electrolyte and continuous with the exposed anode current collector.

In various embodiments, each of the solid-state battery unit cells may comprise an encapsulation layer over the anode current collector layer, and/or each of the metal substrates may comprise a metal foil. In the latter case, the metal foil may comprise steel (e.g., a stainless steel foil), copper, aluminum, nickel, inconel, brass, molybdenum or titanium. The metal substrates may further comprise a barrier (e.g., configured to inhibit or prevent [i] diffusion of metal atoms from the substrate into one or more layers of the battery unit cells and/or [ii] degradation of the substrate and/or attack by chemical agents such as oxygen or water on the substrate) covering an inner major surface of the metal foil.

In another aspect, the present invention relates to a method of making a solid-state battery, comprising forming a plurality of stacked solid-state battery unit cells on a base frame or support, forming first and second exterior contacts on the base frame or support, electrically connecting the exposed cathode current collectors and the exposed anode current collectors to the first and second exterior contacts, respectively, and encapsulating the plurality of solid-state battery unit cells and the first and second electrical connections. As for the battery, each of the stacked solid-state battery unit cells includes a metal substrate and has an exposed cathode current collector and an exposed anode current collector.

In some embodiments of the method, electrically connecting the exposed cathode current collectors and the exposed anode current collectors to the first and second exterior contacts may comprise forming a first electrical connection between the exposed cathode current collectors and the first exterior contact, and forming a second electrical connection between the exposed anode current collectors and the second exterior contact. In further embodiments, the method may further comprise forming sidewall insulation between each of the first and second electrical connections and the solid-state battery unit cells, including the metal substrates.

In some embodiments, forming the stacked solid-state battery unit cells may comprise placing a lowermost solid-state battery unit cell on the base frame or support, and successively stacking the remaining solid-state battery unit cell(s) on the lowermost solid-state battery unit cell. In some cases, successively stacking the remaining solid-state battery unit cell(s) may comprise offsetting a current one of the remaining solid-state battery unit cells from a previously stacked or placed one of the solid-state battery unit cells. Alternatively, successively stacking the remaining solid-state battery unit cell(s) may comprise vertically stacking the remaining solid-state battery unit cell(s) on the lowermost solid-state battery unit cell without offsetting the remaining solid-state battery unit cell(s). In such alternative embodiments, the method may further comprise forming in each remaining solid-state battery unit cell a first cutout along an edge of the corresponding exposed cathode current collector and a second cutout along an edge of the corresponding exposed anode current collector, in which case electrically connecting the exposed cathode current collectors and the exposed anode current collectors to the first and second exterior contacts may comprise forming first electrical connections between the exposed cathode current collectors in the first cutouts, forming second electrical connections between the exposed anode current collectors in the second cutouts, and respectively electrically connecting the exposed cathode current collector and the exposed anode current collector of the lowermost solid-state battery unit cell to the first and second exterior contacts. In some cases, successive remaining solid-state battery unit cells in stacking succession can include increasingly larger first and second cutouts.

In some embodiments, the method may further comprise affixing or securing the solid-state battery unit cells, including the metal substrates, to a flexible stacking substrate. In such embodiments, the method may even further comprise forming first and second electrodes on the flexible stacking substrate, and ohmically contacting each of the exposed cathode current collectors with the first electrode and each of the exposed anode current collectors with the second electrode. For example, ohmically contacting each of the exposed cathode and anode current collectors with the first and second electrodes may comprise placing solder on (i) each of the exposed cathode and anode current collectors or (ii) each of the first and second electrodes in locations corresponding to the exposed cathode and anode current collectors, then contacting the solid-state battery unit cells with the flexible stacking substrate such that the solder is between the exposed cathode and anode current collectors and the first and second electrodes. Additionally or alternatively, the method may further comprise applying an underfill to at least one of the flexible stacking substrate and each of the solid-state battery unit cells prior to contacting the solid-state battery unit cells with the flexible stacking substrate, such that the underfill is between the flexible stacking substrate and each of the solid-state battery unit cells after contacting the solid-state battery unit cells with the flexible stacking substrate.

In some embodiments, the method may further comprise folding the flexible stacking substrate onto itself to form the stacked solid-state battery unit cells. In such embodiments, folding the flexible stacking substrate onto itself may result in adjacent stacked solid-state battery unit cells being face-to-face or back-to-back. In other or further embodiments, the method may further comprise respectively electrically connecting the first and second electrodes to the first and second exterior contacts by wire bonding.

As for the present battery, in the present method, the stacked solid-state battery unit cells may include from 2 to 20 solid-state battery unit cells. More typically, the stacked solid-state battery unit cells include from 3 to 10 solid-state battery unit cells, and more ideally, from 4 to 8 solid-state battery unit cells.

In some embodiments, the method may further comprise forming first and second interior contacts on an opposite major surface of the base frame or support from the first and second exterior contacts. In such embodiments, the method may even further comprise forming first and second through-vias in the base frame or support. The first and second through-vias may be configured to respectively electrically connect the first and second interior contacts to the first and second exterior contacts.

As for the present battery, each of the metal substrates may comprise a metal foil in the present method. For example, the metal foil may comprise steel (e.g., a stainless steel foil), copper, aluminum, nickel, inconel, brass, molybdenum or titanium. In further embodiments, the method may further comprise covering an inner major surface of each metal foil with a barrier. The barrier may be as described for the present battery.

The description below presents methods for making flexible and ultra-thin stacked solid-state batteries. In addition, the methods can use batteries having a standard die or SMT form factor, thereby enabling standard high-throughput assembly techniques. The methods described below provide processes for producing stacked thin film solid-state batteries on conductive substrates. The methods described here achieve best-in-class volumetric energy densities. These and other advantages of the present invention will become readily apparent from the detailed description of various embodiments below.

DETAILED DESCRIPTION

Figure 1A:
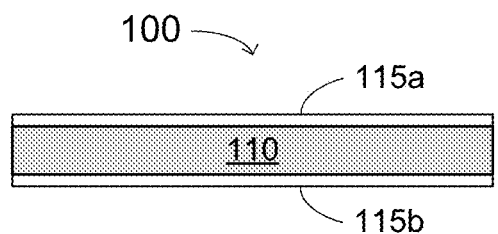
FIGS. 1A-4B show intermediate and final structures in an exemplary method of singulating solid-state batteries on a conductive substrate, according to embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

For the sake of convenience and simplicity, the terms "part," "portion," and "region" may be used interchangeably but these terms are also generally given their art-recognized meanings. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The term "length" generally refers to the largest dimension of a given 3-dimensional structure or feature. The term "width" generally refers to the second largest dimension of a given 3-dimensional structure or feature. The term "thickness" generally refers to a smallest dimension of a given 3-dimensional structure or feature. The length and the width, or the width and the thickness, may be the same in some cases. A "major surface" refers to a surface defined by the two largest dimensions of a given structure or feature, which in the case of a structure or feature having a circular surface, may be defined by the radius of the circle.

Batteries are two terminal devices and may be electrically and mechanically connected in parallel to create larger capacity cells while maintaining the same voltage. They may also be electrically and mechanically connected in series to increase the voltage and maintain the same capacity. In the present invention, the batteries are diced, assembled and stacked vertically in any of a variety of different processes to ensure that (a) shorting does not occur, (b) the volumetric energy density is maximized by minimizing substrate area, encapsulation materials, and assembly materials, and (c) the overall process is manufacturable and produces a battery having a usable form factor.

Current battery stacking for thin film solid-state batteries uses insulating substrates in which through-hole vias are first formed in each battery unit cell, then the unit cells are stacked on top of one another and connected with a conductive epoxy. Insulating substrates are brittle and become difficult to handle as the die become less than 100 microns thick. Additionally, the extra process complexity of thinned dies with through-hole vias adds cost to the battery. It is for these reasons that the current battery substrate and stacking techniques present obstacles to increasing the battery capacity within the same packaging dimensions.

The use of steel or other metallic/conductive substrates allows for thin film solid-state batteries to be ultrathin (<30 microns) and to be stacked in a standard or commercially acceptable form factor. Methods of vertical battery stacking and connecting are disclosed herein that allow for higher-capacity batteries within the same footprint or area as compared to the same battery on silicon, glass, or ceramic substrates. Recent tests have shown that die can be thinned to 5 microns, yet maintain full functionality. This level of robustness cannot be achieved by traditional silicon-based batteries. Additionally, process steps are included that enable batteries to be made using a common SMT platform so that they can be easily integrated onto a flexible or rigid printed circuit board (PCB).

The present invention concerns a method of manufacturing a stacked, electrically-connected solid-state battery, comprising thinning a plurality of solid-state battery unit cells on a metal substrate, dicing or singulating the unit cells on the metal substrate, stacking the individual (i.e., diced or singulated) unit cells, and electrically connecting the stacked unit cells. The stacked unit cells can be electrically connected serially and/or in parallel, although connecting the stacked unit cells in parallel as shown herein maximizes the output current of the packaged, stacked battery. The method may further comprise electrically isolating the substrate sidewalls following dicing or singulation. The following description provides examples of stacked batteries and general manufacturing, stacking, and integration processes for such stacked batteries.

An Exemplary Method of Singulating Battery Dies

FIGS. 1A-4B show intermediate and final structures in an exemplary method of singulating solid-state batteries on a conductive substrate, according to embodiments of the present invention. FIGS. 1A, 2A, 3A and 4A show cross-sectional views, and FIGS. 1B, 2B, 3B and 4B are layout or top-down views.

The substrate 100 comprises a metal foil 110, coated with first and second barriers 115a-b on opposite major surfaces thereof. In the layout view of FIG. 1B, the barrier 115a (which is coextensive with the metal foil 110) is not shown. The metal in the metal foil 110 may comprise or consist essentially of stainless steel, aluminum, copper, nickel, inconel, brass, molybdenum or titanium, the elemental metals of which may be alloyed with up to 10% of one or more other elements to improve one or more physical and/or chemical properties thereof (e.g., oxygen and/or water permeability, flexibility, resistance to corrosion or chemical attack during subsequent processing, etc.). The metal foil can also be a metal sheet or metal roll. For example, the metal foil may be 10-100 µm thick, whereas a metal sheet may have a thickness of >100 µm, up to about 1-2 mm, although the invention is not so limited.

Figure 1B:
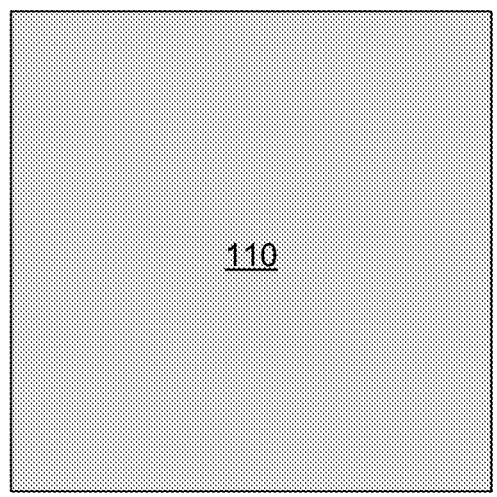

In one example, the metal foil 110 comprises polished or adequately smooth (e.g., having an average surface roughness of <1 µm or any value less than 1 µm) stainless steel having a thickness of about 100 µm. The substrate 100 can be made as thin as 10 µm but is typically >20 µm when processed by roll-to-roll (R2R) processing (i.e., when the substrate 100 is in a roll form). The metal foil 110 in FIGS. 1A-B is in sheet form, but has a thickness characteristic of a foil.

The barrier 115a-b comprises one or more layers of one or more materials in a thickness effective to prevent migration of atoms or ions from the metal foil 110 into overlying layers. The material(s) may comprise a glass or ceramic, such as silicon dioxide, aluminum oxide, silicon nitride, a silicon and/or aluminum oxynitride, etc., or a metal nitride, such as aluminum nitride, titanium nitride, titanium aluminum nitride, tungsten nitride, etc. In some embodiments, each of the first and second barriers 115a-b comprises alternating glass/ceramic and metal nitride layers (e.g., a first metal nitride layer, a first glass/ceramic layer, and a second metal nitride layer, which may further comprise a second glass/ceramic layer, a third metal nitride layer, etc.). Each barrier 115a or 115b may have a total thickness of 0.5-3 µm, but the barrier 115 is not limited to this range. The barriers 115a-b may be blanket-deposited onto the metal foil 110 by chemical or physical vapor deposition, solution-phase coating with a precursor material followed by annealing to form the glass/ceramic or metal nitride, etc. Exemplary barrier materials, structures and thicknesses and methods for their deposition are disclosed in U.S. Pat. No. 9,299,845 and U.S. patent application Ser. No. 16/659,871, filed Oct. 22, 2019, the relevant portions of each of which are incorporated by reference herein.

The substrate 100 should be as thin as possible to increase the overall contribution of the active battery stack and maximize its volumetric energy density. Another way to do this is to thin (or reduce the thickness of) the substrate 100. In some examples (e.g., when the foil 110 is stainless steel), the substrate 100 may be thinned down to 10 µm or less (e.g., <5 µm) by blanket wet chemical etching, mechanical polishing, grinding or a combination thereof, but the invention is not limited thereto. For example, when the metal foil 110 comprises stainless steel, it may be thinned by chemical etching using a solution of $FeCl_3$, which may be sprayed onto the backside of the foil 110 following removal of the barrier 115b by a different technique, such as grinding, chemical-mechanical polishing, or blanket wet or dry etching.

Typically, the backside of the substrate 100 (e.g., having the barrier 115b thereon) is thinned while protecting the front side from being attacked by the etchant, mechanical polisher, or other potential source of damage. In some embodiments, the front side of the substrate (e.g., with the battery cells 120 thereon; see FIGS. 2A-B) may be protected with a blanket protective film on or over the cells 120. The protective film, which may comprise a thermoplastic polymer film or layer such as poly(tetrafluoro-ethylene), can be released in a subsequent step. The thinned substrate 112 (see FIGS. 3A-B) should have a thickness sufficient to maintain its hermetic sealing capability against ingress of oxygen and water. This minimum thickness may be from 2 µm to <5 µm (e.g., 3 or 4 µm), but the invention is not so limited.

Figure 2A:
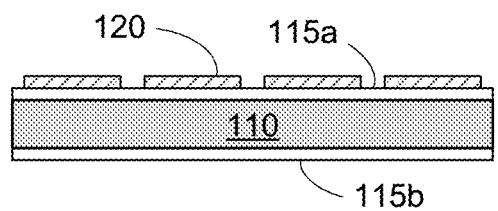
Figure 2B:
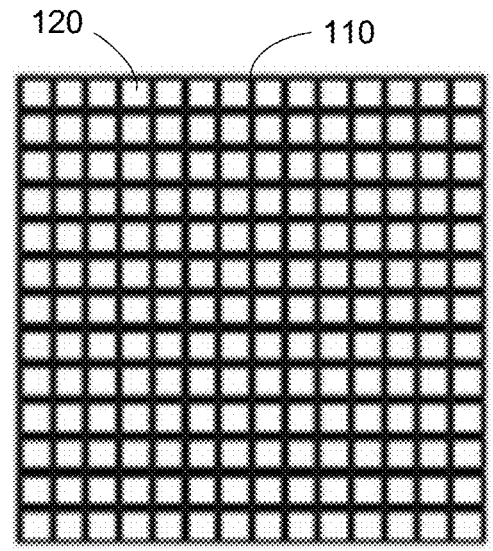

FIGS. 2A-B show the substrate sheet 100 (comprising the metal foil 110) with battery cells 120 thereon. FIG. 2A is a partial cross-section of the full sheet shown in FIG. 2B, although the invention is not limited to a sheet 100 or array of cells 120 as shown in FIG. 2B. The cells 120 may be made as described in co-pending U.S. Provisional Application No. 63/008,406, filed Apr. 10, 2020, the relevant portions of which are incorporated herein by reference. For example, the cathode current collector generally comprises a conductor, such as gold, silver, copper, platinum, aluminum, or other conductive metal or conductive alloy thereof. The cathode may comprise a lithium metal oxide or lithium metal phosphate, such as lithium cobalt oxide (LiCoO$_2$, LCO), lithium manganese oxide (LiMn$_2$O$_4$; LMO), or lithium iron phosphate (LiFePO$_4$, LPO). The electrolyte layer generally comprises a lithium-containing glass or ceramic material, such as lithium phosphorus oxynitride (LiPON), lithium borosilicates (Li$_2$O—B$_2$O$_3$—SiO$_2$), lithium vanadosilicates (Li$_2$O—V$_2$O$_5$—SiO$_2$), lithium aluminum/titanium phosphates (Li$_{1+x}$Al$_x$Ti$_2$-x(PO$_4$)$_3$, or LATP), lithium lanthanum zirconium oxide (Li$_7$La$_3$Zr$_2$O$_{12}$ or LLZO), etc. The anode current collector generally comprises a conductive metal, such as nickel, zinc, copper, aluminum, etc., or another conductor, such as graphite. The array of cells 120 may comprise an x-by-y array, where x is the number of rows of cells 120 and is an integer of 2 or more (e.g., 2-100, or any integer or range of integers therein), and y is the number of columns of cells 120 and is independently an integer of 2 or more (e.g., 2-100, or any integer or range of integers therein). Generally, the cells 120 are protected with an overlying layer of encapsulation, but the encapsulation is not required when the cells 120 are otherwise protected from oxygen and water (e.g., are processed in a dry, oxygen-free environment such as a glove box or other sealable chamber is which the atmosphere can be controlled).

Figure 3A:
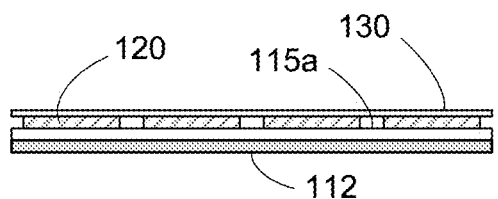
Figure 3B:
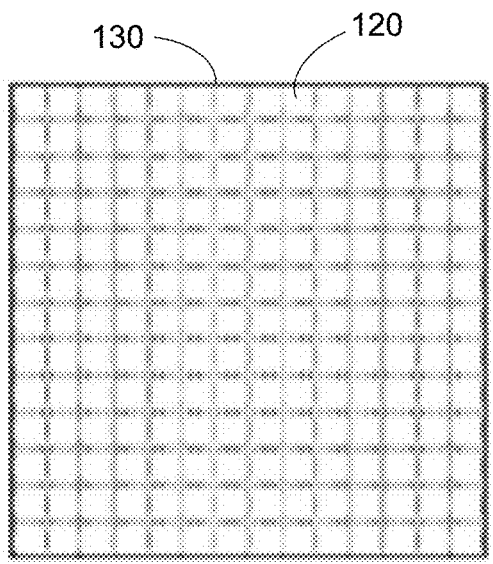

As shown in FIG. 3A, the substrate 100 with the battery unit cells 120 thereon is thinned as described herein, then the unit cells 120 on the thin foil substrate 112 are singulated (e.g., by laser dicing, wet chemical etching, mechanical sawing, or half-cut dicing). A UV dicing tape 130 may be applied to the (encapsulated) unit cells 120 prior to thinning to protect the battery unit cells 120, provide mechanical support, and/or otherwise facilitate processing. Optionally, a dicing die attach film (DDAF; see film sections 135 in FIG. 4A) may be placed onto the backside of the thinned foil 112 prior to dicing to facilitate die stacking and mechanical bonding during later steps. Before or after thinning, the relatively large sheet may be cut into sections (e.g., 2, 4, etc., sections of equal size) or strips (e.g., 1 or 2 rows or columns) to facilitate subsequent processing and/or to reduce losses (e.g., due to the relative mechanical fragility of the thinned foil 112), although the invention is not so limited.

Figure 5A:
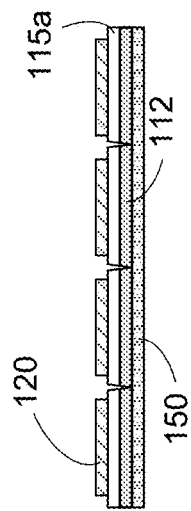
FIGS. 5A-6C are cross-sectional views of solid-state batteries on a conductive substrate in a more detailed method of singulating such batteries according to one or more embodiments of the present invention.
Figure 5B:
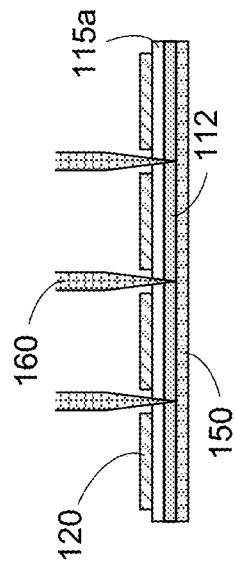
Figure 5C:
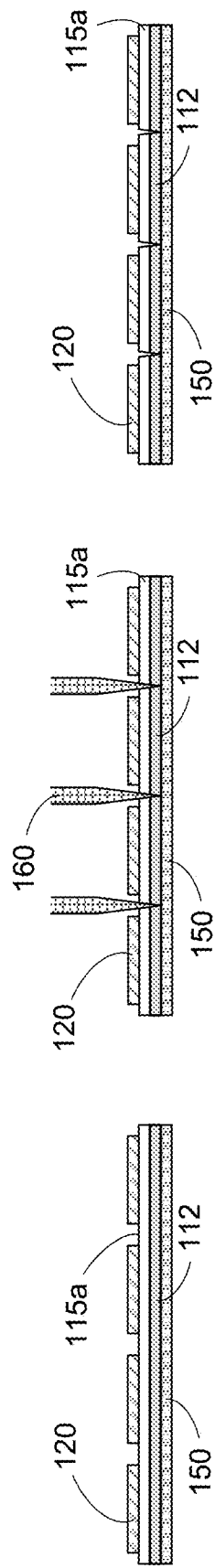
Figure 6A:
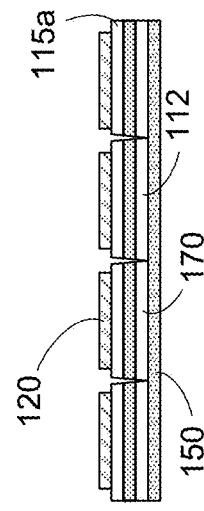
Figure 6B:
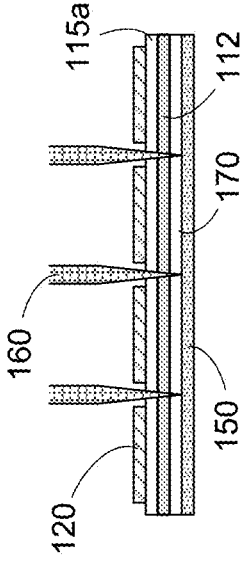
Figure 6C:
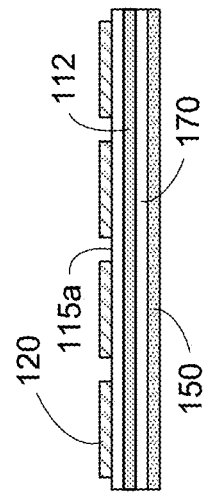

An exemplary half-cut dicing process is shown in FIGS. 5A-6C. FIGS. 5A-5C show the process for cells 120 on a thinned foil 112 to which a backside dicing tape 150 is applied. FIGS. 6A-6C show the process for the same cells 120 and thin foil 112, but in which the dicing tape 150 is secured or affixed to the thin foil 112 by an adhesive layer 170. The DDAF may be present or, as shown in FIGS. 5A-6C, absent.

FIGS. 5A and 6A show the unit cells 120 on the first barrier 115a and the thinned foil 112. A dicing tape 150 is on the backside of the thinned foil 112. Optionally, the dicing tape 150 may be secured to the thinned foil 112 by an adhesive 170. When present, the DDAF 135 may facilitate die stacking and mechanical bonding during subsequent processing (e.g., after dicing/singulation).

FIG. 5B shows the first barrier 115a and the thinned foil 112 being cut (e.g., by cutting tools 160) between the unit cells 120. FIG. 6B shows the same thing, but with the adhesive layer 170 also being cut. In both FIGS. 5B and 6B, the dicing tape 150 remains intact during the half-cut. The cutting tools 160 may comprise a knife or other sharp edge, a saw, etc., but the invention is not so limited. For example, a laser can also selectively cut the first barrier 115a, the thinned foil 112 and the adhesive 170 by appropriately selecting the wavelength and power/intensity of the light emitted from the laser. FIGS. 5C and 6C show the unit cells 120 on the separated first barrier 115a and thinned foil 112, while the dicing tape 150 is intact.

Figure 4A:
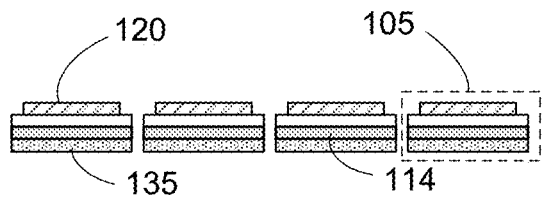
Figure 4B:
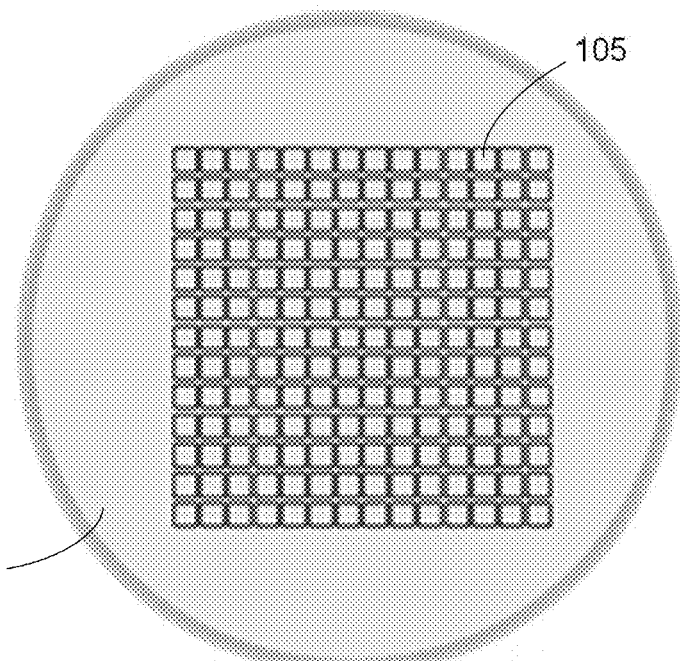

Alternatively, a punch or stamp (which may be particularly advantageous the thinner the thin foil 112 becomes) can be used to singulate individual die 105 (see, e.g., FIG. 4A). The UV dicing tape 130 (FIG. 3A), if present, may be removed before or after punching/stamping. When the DDAF is present, it is applied to the backside of the thinned foil substrate 112 prior to punching/stamping. In any case, the singulated die 105 can then be placed in a tray or other die holder 140 (FIG. 4B) for subsequent processing (e.g., a pick-and-place operation).

Figure 7A:
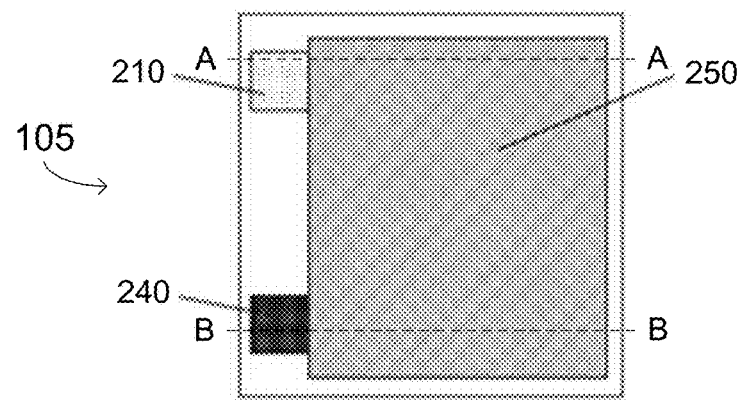
FIGS. 7A-7C are layout and cross-sectional views of an exemplary solid-state battery according to an embodiment of the present invention.
Figure 7B:
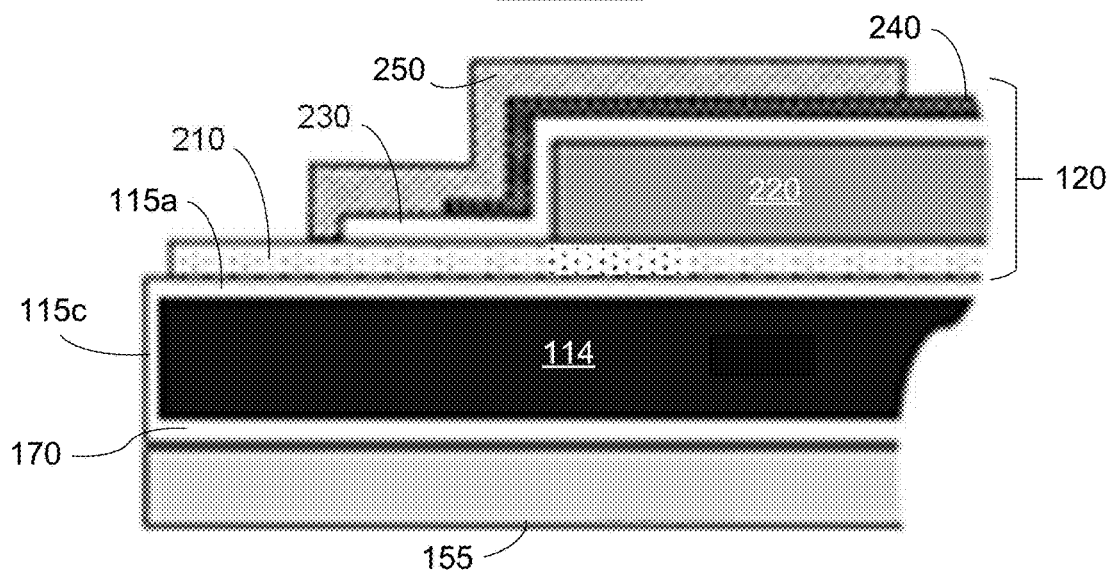
Figure 7C:
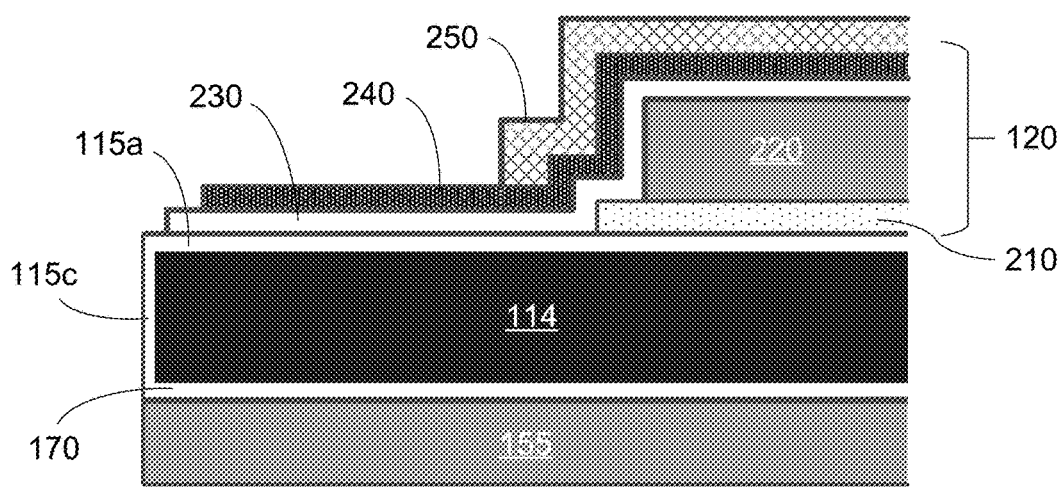

FIGS. 7A-C show top-down (or layout) and cross-sectional views of the singulated die 105. The top-down view in FIG. 7A shows the optional encapsulation layer 250 and exposed regions (or tabs) of the cathode current collector 210 and the anode current collector 240 that may effectively function as bond pads during subsequent electrical connection. FIG. 7B is a cross-sectional view of the die 105 along the line A-A in FIG. 7A in the part of the die 105 including and adjacent to the exposed cathode current collector 210. FIG. 7C is a cross-sectional view of the die 105 along the line B-B in FIG. 7A in the part of the die 105 including and adjacent to the exposed anode current collector 240.

FIGS. 7B-C show the cut/singulated metal foil 114 with the first barrier 115a of the front (battery cell) side, the adhesive 170 and a die attach film (DAF) 155 on the backside, and an isolation layer 115c on the sidewalls of the singulated foil 114. The DAF 155 may be the same as or different from the DDAF 135 in FIG. 4A. Prior to creating connections among the stacked die 105, the substrate sidewalls can be insulated to prevent shorting (e.g., during or after formation of the electrical connection[s], for example by an aerosol process or wire bonding). Insulating (e.g., organic polymer) materials such as SU-8 or other resist material, an epoxy, a polyimide, etc., can be printed or dispensed along each sidewall, or just those sidewalls over which an electrical connection between adjacent cells is to be formed, to form the isolation layer 115c in FIGS. 7B-C. Techniques for depositing the insulating material can include inkjetting, aerosol jet spraying, screen printing, gravure printing, flexographic printing, etc.

The unit cell 120 on the first barrier 115a includes a lowermost cathode current collector 210, a cathode 220, an electrolyte 230, and an anode current collector 240. In the case of solid-state lithium batteries, a separately-formed anode is not necessary, as a lithium anode can be formed between the electrolyte 230 and the anode current collector 240 during charging. Optionally, however, a thin lithium anode can be deposited by evaporation onto the electrolyte layer 230 prior to formation of the anode current collector 240. The optional encapsulation layer 250 (which may not be part of the unit cell 120 even when present) may be over the entire battery cell stack (i.e., layers 210, 220, 230 and 240, other than the exposed regions or tabs of the cathode current collector 210 and the anode current collector 240) or over just the portion of the die 105 and cell 120 where the electrolyte 230 and anode current collector 240 form a step over the sidewall of the cathode 220 and the region of the cell 120 inside and immediately adjacent thereto.

Figure 8A:
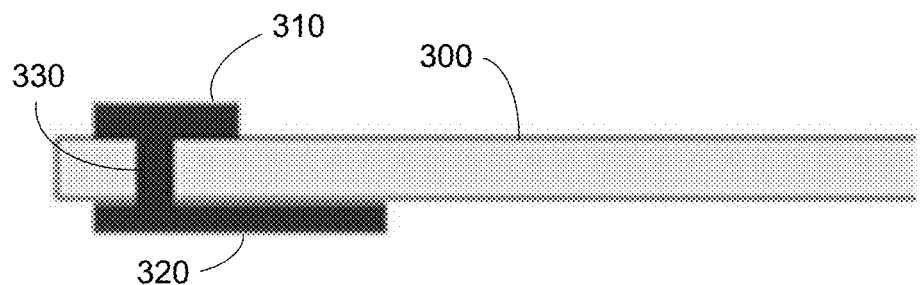
FIGS. 8A-E show intermediate and final structures in an exemplary method of stacking solid-state batteries according to one or more embodiments of the present invention.
Figure 8B:
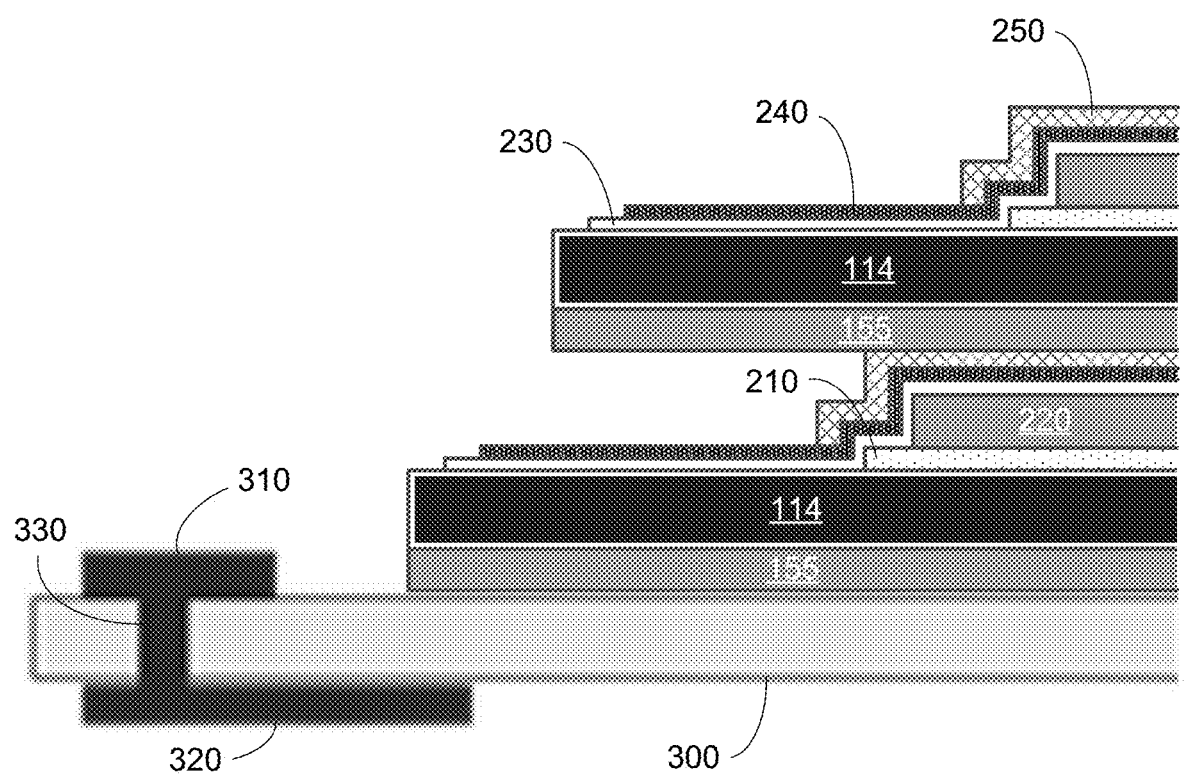
Figure 8C:
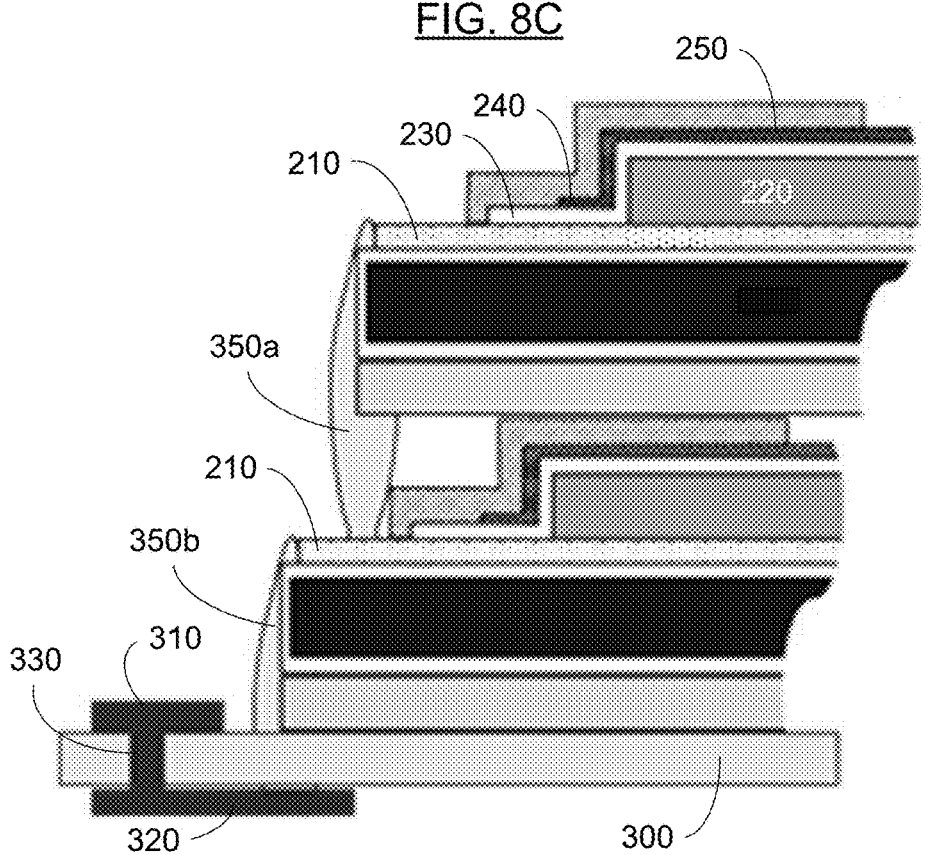

The thin battery die 105 may now be stacked in a staggered fashion, for example as shown in FIG. 8B, exposing the bond pads (e.g., the regions of the cathode and anode current collectors 210 and 240 shown in FIG. 7A). Typically, from two to twenty die 105 are stacked in a single package, depending on the offset between adjacent die 105 and/or the technique used to electrically connect the cells 120. An epoxy or other non-conductive adhesive may be dispensed onto the encapsulation (when present) and/or the backside of the thin foil 112 or DAF film 155 (if retained) prior to stacking the die 105. The use of a conventional die attach film (e.g., DAF 155) on the backside of the die 105 may allow the die 105 to be stacked sequentially.

The die 105 can be placed on a lead frame 300 (FIG. 8A) with electrical contacts 310 and 320 thereon. The interior electrical contact 310 on the lead frame 300 may be in ohmic contact with current collectors 210 in the unit cells 120 or terminals thereto (see, e.g., U.S. Provisional Application No. 63/008,406, filed Apr. 10, 2020, the relevant portions of which are incorporated herein by reference). A through-via 330 electrically connects the interior electrical contact 310 to the exterior electrical contact 320. The contacts 310 and 320 and through-via 210 may be conventionally formed and may comprise gold, copper, silver, aluminum, etc. The contacts 310 and 320 may have a thickness of 1-25 µm or any value or range of values therein (e.g., 10 µm or about 10 µm). A similarly-configured interior electrical contact (connected to a similar exterior electrical contact by a similar through-via) is in ohmic contact with the anode current collectors 240 in the unit cells 120 (or terminals thereto). Alternatively, the die 105 may be placed onto a flexible or rigid PCB substrate (e.g., a BT substrate) with similarly-configured contacts and vias, instead of the lead frame 300.

As shown in FIG. 8B, the first or lowermost die 105 is placed on the lead frame 300, offset from the interior contact 310 by a predetermined distance. The predetermined distance may be on the order of or about 10 µm (e.g., 8-12 µm), but the invention is not so limited. Successive die 105 are then stacked on the first or lowermost die 105, but offset by the same or different predetermined distance (e.g., about 10 to about 20 µm) so that the bond pads 240 are exposed. In one example, the offset between upper and lower adjacent die 105 is measured from the outermost exposed edge of the anode current collector (bond pad) 240. FIG. 8B shows a cross-section along the exposed anode current collector 240, similar to the line B-B in FIG. 7A, but the principles of stacking and offset can also apply to the exposed part (bond pad) of the cathode current collector 210.

Figure 8D:
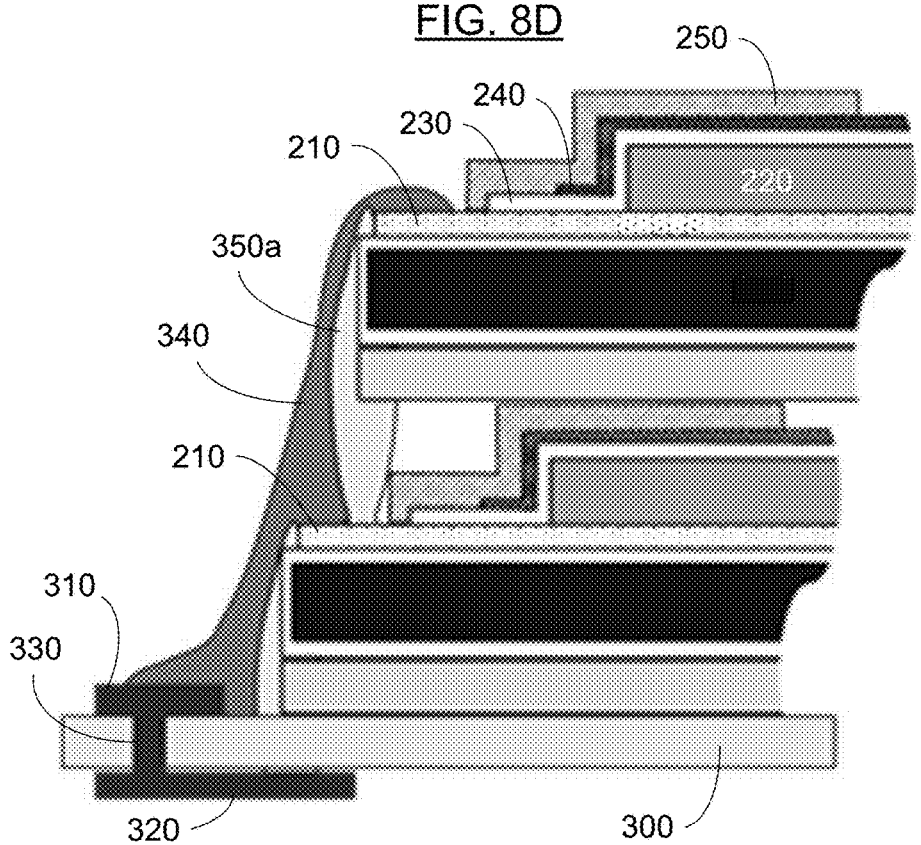

Referring now to FIG. 8D, electrical connections 340 from each bond pad 210 to the interior electrical contact 310 on the lead frame 300 may be made using aerosol jet spraying or printing. Optionally, prior to forming the electrical connections 340, relatively thick insulating structures 350a-b may be formed on the sidewalls of the die 105 adjacent to the bond pads 210 and 240 by aerosol jet spraying or printing. The use of aerosol allows for wires (i.e., electrical connection structures 340) having a smaller height and diameter than those used in conventional wire bonding. Aerosol jet spraying can form wire bonds or other electrical connections with heights as small as 10 µm on bond pads having a pitch as small as 60 microns. To facilitate good electrical connection, separate bond pads can be formed on the exposed regions of the cathode and anode current collectors 210 and 240 from gold, palladium, platinum, or nickel (e.g., by electroplating, electroless plating, evaporation, sputtering, printing, etc.). Electrical connections 340 formed by aerosol jet spraying or printing may comprise gold, silver, or copper. As shown in FIG. 8D, the electrical connections 340 connect the battery cells 120 in parallel.

When solid-state lithium batteries (SSLBs) are charged, their thickness can increase by up to 20%. Physical expansion and contraction of the stack in SSLBs during charging and discharging is typically +/−10% of the thickness of the cathode 220 per cell 120. Therefore, the electrical interconnects 340 for SSLBs should be able to stretch by more than 20% without losing conductivity. Stretchable conductive inks are commercially available. Alternatively, a serpentine electrical interconnect structure made using a less stretchable material can minimize the mechanical impact of the battery increasing or decreasing its thickness.

Figure 8E:
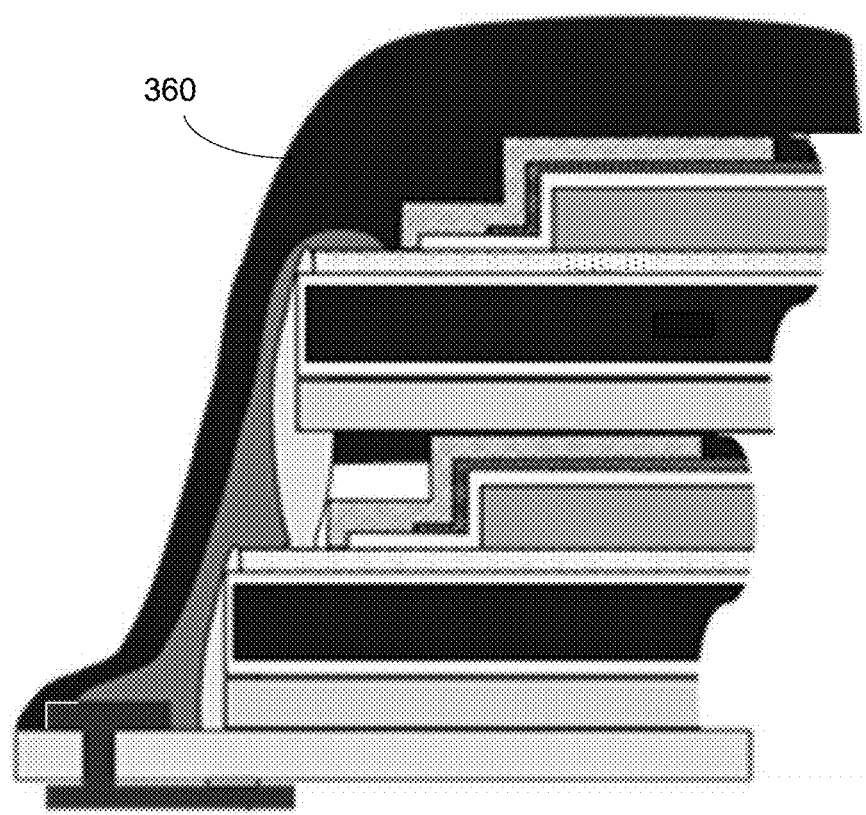

As shown in FIG. 8E, a final encapsulation 360 can be formed over the stacked, electrically-connected battery cells. For example, an epoxy can be dispensed or otherwise formed on top of the stack to encase the entire stack. Alternatively, another organic polymer (e.g., low-density polyethylene, a [meth]acrylic/[meth]acrylate polymer or copolymer, a silicone polymer, a urethane, a parylene, etc.) can be used to form the encapsulation 360, for example by spraying, dispensing (e.g., hot-melt extrusion), brush coating, roller coating, dip coating, injection or other molding, etc.

Figure 9A:
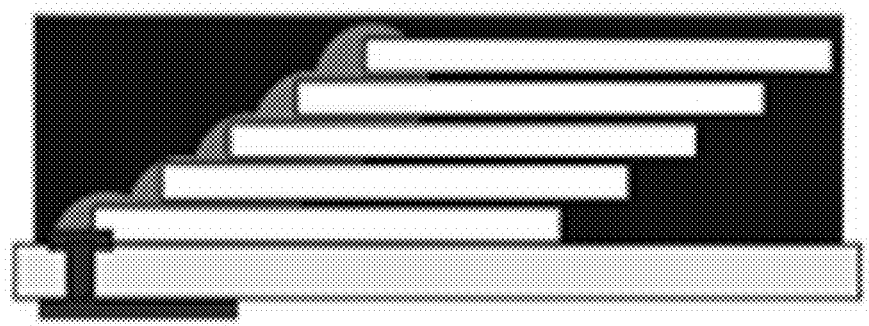
FIGS. 9A-C show various views of an exemplary packaged, stacked solid-state battery according to embodiments of the present invention.
Figure 9B:
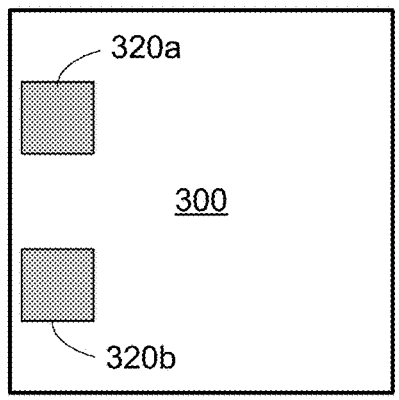
Figure 9C:
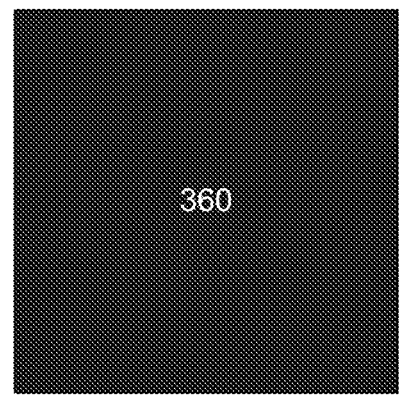

The final form factor (see, e.g., FIG. 9A) of the stacked, electrically-connected, encapsulated battery cells can be compatible with SMT or SMD processing techniques (e.g., for integration into wearable or flexible electronics). A bottom view of the stacked, electrically-connected, encapsulated battery (e.g., the underside of the lead frame 300 with exterior contacts 320a-b to the cathode and anode current collectors) is shown in FIG. 9B, and a top view (i.e., of encapsulation 360) is shown in FIG. 9C.

Exemplary Alternative Methods of Stacking and/or Connecting Battery Cells

Figure 10A:
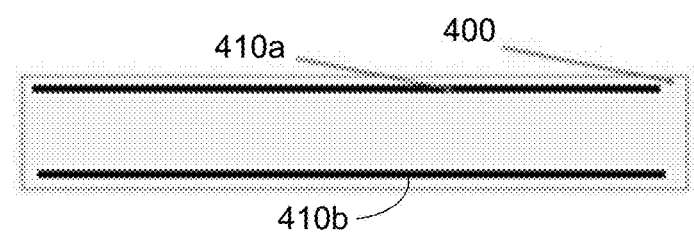
FIGS. 10A-C show various structures in an exemplary method of connecting solid-state batteries in parallel on a flexible substrate according to one or more embodiments of the present invention.
Figure 10B:
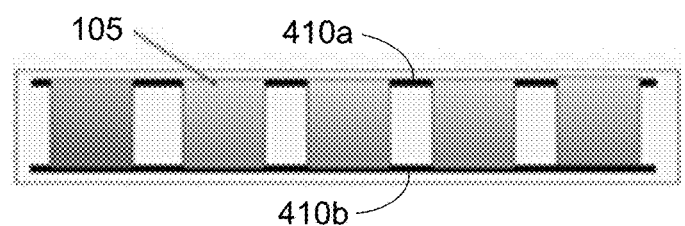
Figure 10C:
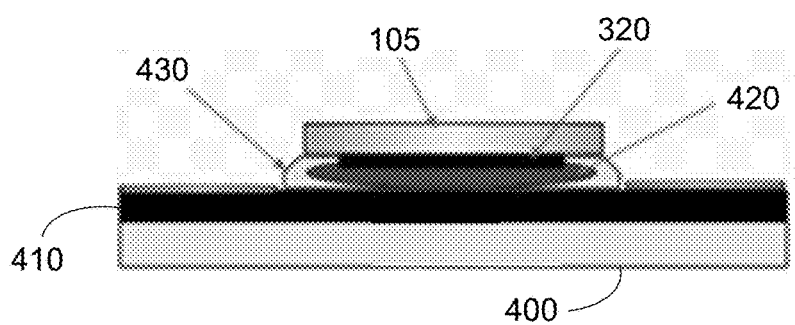

An alternative method of stacking battery cells comprises folding the dies on a thin, flexible PCB. FIGS. 10A-C show structures made in a process of mounting solid-state battery dies on a flexible substrate and electrically connecting the dies in parallel.

After dicing, dies 105 (FIG. 10B) are placed onto a flex PCB panel 400 (FIG. 10A) with electrodes 410a-b (e.g., traces) thereon. The electrodes 410a-b are configured to connect the battery cells on the dies 105 in parallel when assembled and packaged.

The flex PCB panel 400 may comprise an insulating film such as a polyimide, polyethylene naphthalate (PEN), polyethylene terephthalate (PET), etc. The electrodes 410a-b may comprise one or more metals such as copper, aluminum, silver, gold, nickel, zinc, titanium, tungsten, etc., and may have a thickness ranging from 0.2-30 µm or any value or range of values therein (e.g., 0.5-20 µm). An overcoat of Sn may be present on the outermost surface of the electrodes 410a-b in some instances to facilitate ohmic contact. The electrodes 410a-b can be fabricated by laminating a metal foil on the panel 400, printing a resist pattern on the foil, then etching the exposed foil. Alternatively, the electrodes 410a-b may be made by printing a seed layer pattern (e.g., comprising palladium) on the panel 400, followed by plating a bulk metal on the seed layer, or by directly printing a metal ink and/or paste on the panel 400 in a pattern corresponding to the electrodes 410a-b and sintering the printed metal ink and/or paste to form the electrodes 410a-b. Thin, low-resistance traces may also be formed by sputtering, evaporation, or other thin film vacuum deposition techniques.

Figure 15A:
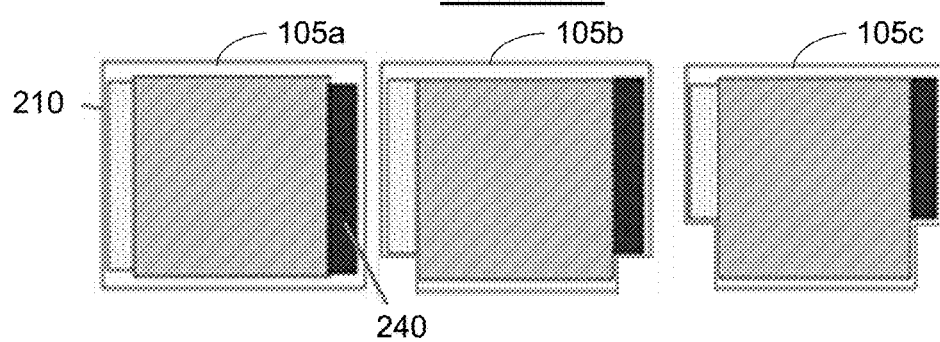
FIGS. 15A-C show various structures in an exemplary method of connecting stacked solid-state batteries in parallel according to another embodiment of the present invention.
Figure 15B:
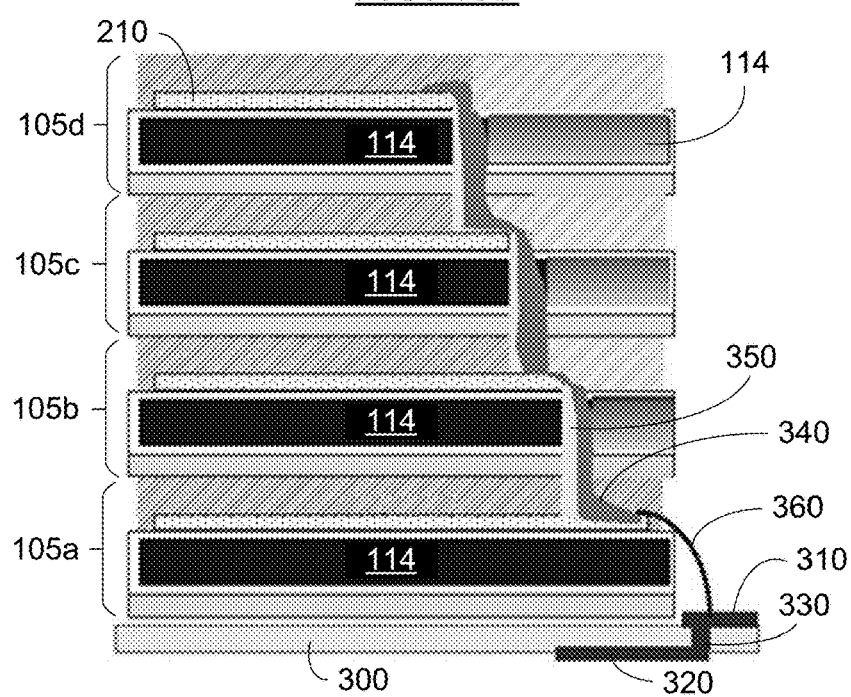
Figure 15C:
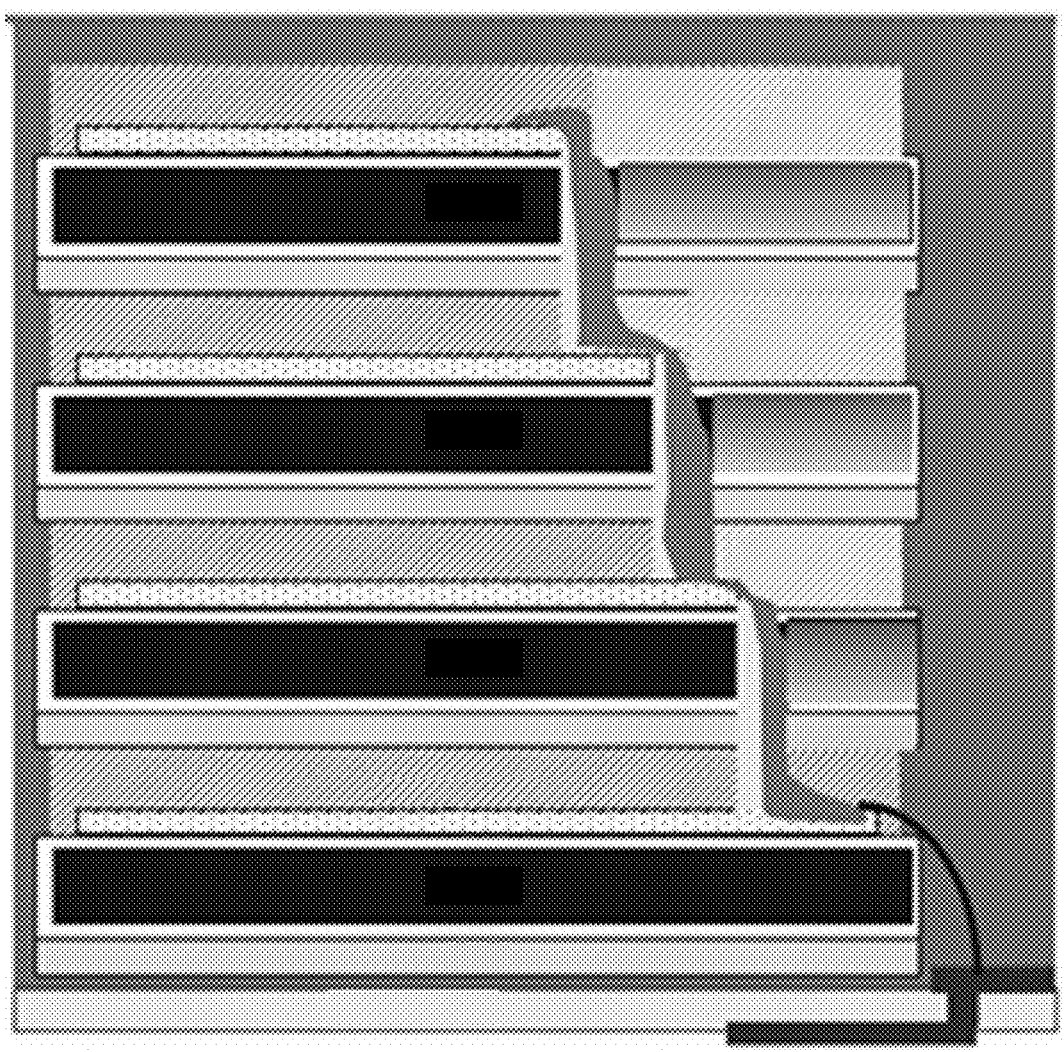

The dies 105 can be picked up and placed onto the panel 400 (FIG. 10B) using a flip chip attach process, a rotary (pick and place) feed mechanism, or direct punching and placing. When the electrodes 410a-b are spaced apart by a distance close to the width or length of the die 105, the exterior contacts 320a-b when on the same side or end of the lead frame (or other support) 300 should extend to the outer edge of the lead frame 300 (i.e., the upper and lower edges of the lead frame 300 in FIG. 9A). Alternatively, the exterior contacts 320a-b can be on opposite sides or ends of the lead frame 300, as shown in the example of FIGS. 15A-B.

Referring now to FIG. 10C, when the dies 105 are picked up and placed onto the panel 400 by flip chip attaching, the bond pads 320 are connected to the electrode 410 face down (towards the flexible substrate 400) via solder 420. For example, the flexible substrate 400 may comprise a single-sided flexible PCB. The dies 105 may be further secured to and/or stabilized on the flexible substrate 400 by underfill 430. The underfill 430 may comprise, for example, an organic thermoset polymer/resin such as an epoxy. An alternative to the solder and underfill is a solder/resin combination, such as a SAM resin (e.g., SAM 10, available from Tamura Corporation, Osaka, JP) or a self-alignment adhesive with solder (SAAS). Both SAM resins and SAAS's are commercially available from Panasonic Corporation, Tokyo, JP; Namics Corporation, Niigata City, JP; and Nagase & Co., Ltd., Tokyo, JP.

Figure 11A:
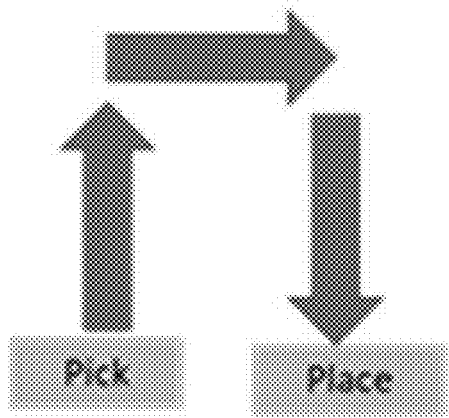
FIGS. 11A-B compare two methods of placing batteries on a substrate.
Figure 11B:
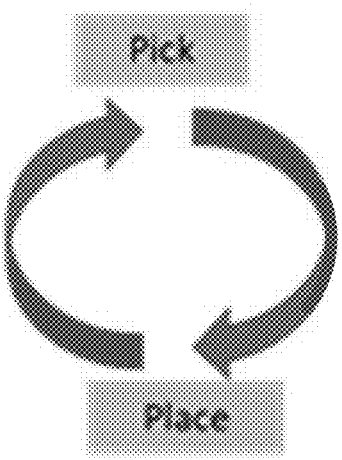

In other embodiments, a rotary pick & place technique (FIG. 11B) is used to improve productivity when assembling battery unit cells/die on a tape-based substrate, such as a flexible printed circuit (FPC) tape, to make a chain, string or sequence of batteries or battery cells on a tape. For example, the FPC tape may comprise or consist essentially of a film or roll of PET, fiberglass, PTFE, Kapton, a polyimide, etc., having a width of 102-120% of a small multiple of the width or length of a battery die 105 (where the small multiple is an integer of from 1 to 10, or any integer or range of integers therein) and a length of from ~10-20 battery dies (e.g., 20-200 mm) to 100 meters or more. Conventional pick and place machines (represented by the diagram in FIG. 11A) have a placement accuracy of less than 50 μm. However, placement on an FPC tape can be relaxed (and can optionally be self-aligned) if a solder is used to bond the die 105/bond pads 320 to the electrodes 410. The battery dies 105 can be fed in this process using a conventional tape feeder.

Alternatively, the dies 105 can be placed on a substrate for the stacking operation by a punch and place process. The punch and place process simplifies the processes of dicing and of pick and place by integrating them in a single process/step. Punching can be used advantageously with a thin substrate 112 (e.g., <10 μm), thereby allowing for a longer punch die life.

Figure 12:
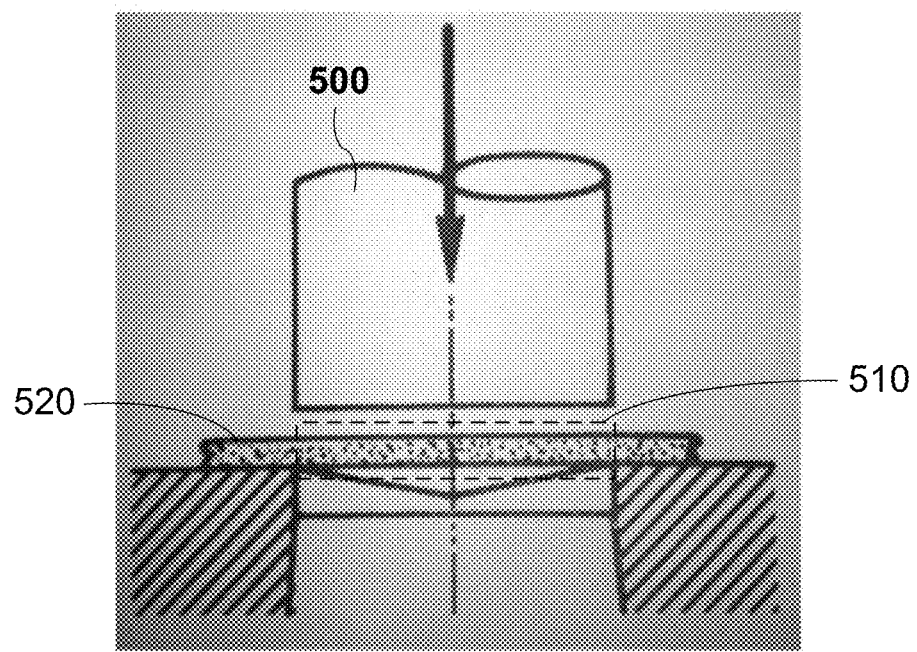
FIG. 12 is a side view/cross-section of an exemplary die punch for singulating solid-state batteries according to embodiments of the present invention.

Punching to cut metal sheets (e.g., stainless steel) has been a mature process for tens of years in the metal manufacturing industry. Referring to FIG. 12, a precision punch die 500 can make small parts 510 from metal sheets 520 with a high level of engineering control. Metal foil/sheet punching has the potential to dice hundreds of units at one punch (e.g., when the punching procedure in performed in parallel). The throughput is high and operation cost is low in comparison to other dicing and pick-and-place operations and equipment.

Figure 13:
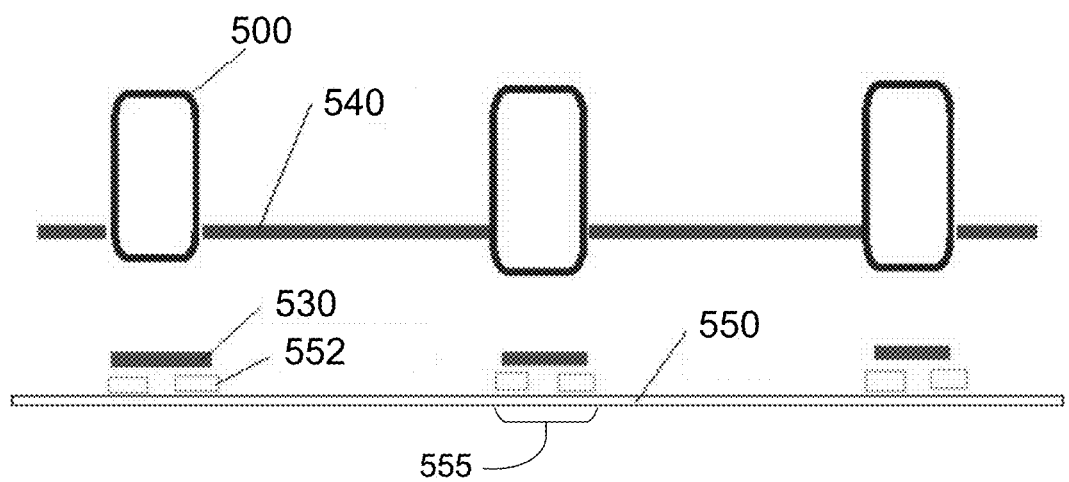
FIG. 13 shows an exemplary parallel die punch according to an embodiment of the present invention.

As shown in FIG. 13, multiple devices 530 (e.g., battery dies) can be punched from a (thinned) metal foil substrate 540 (e.g., a stainless steel sheet or foil) in parallel using punching dies 500 operably connected to a conventional automated metal punching apparatus (not shown). The spacing between battery dies 530 in FIG. 13 is not to scale, and is exaggerated for clarity. The battery dies 530 can be transferred onto receiving locations 555 on the flexible stacking substrate 550 having electrical connection pads 552 thereon. In some embodiments, the punching dies 500 can transfer the battery dies 530 directly onto the receiving locations 555 and the electrical connection pads 552. An adhesive (e.g., an epoxy) can be dispensed onto the flexible substrate 550 in the receiving locations 555 (other than the locations of the electrical connection pads 552) prior to placement of the battery dies 530. The positions and angles of the battery dies 530 on the flexible substrate 550 can be adjusted (e.g., by lateral movement and/or rotation) so that the placement is within the placement accuracy process window. Heat and/or pressure (or, optionally, light) may then be applied to these devices for permanent connection and formation of ohmic contacts (e.g., to the electrical connection pads 552).

Benefits of the punch and place process include integrating singulation and die attachment into a single tool to increase the throughput and to simplify the steps. It also saves the cost and waste of the die carrier film used during dicing, but removed prior to or during attachment, thus reducing the consumption of material, the total number of steps, and the associated costs.

An Exemplary Battery Stacking Process

Figure 14A:
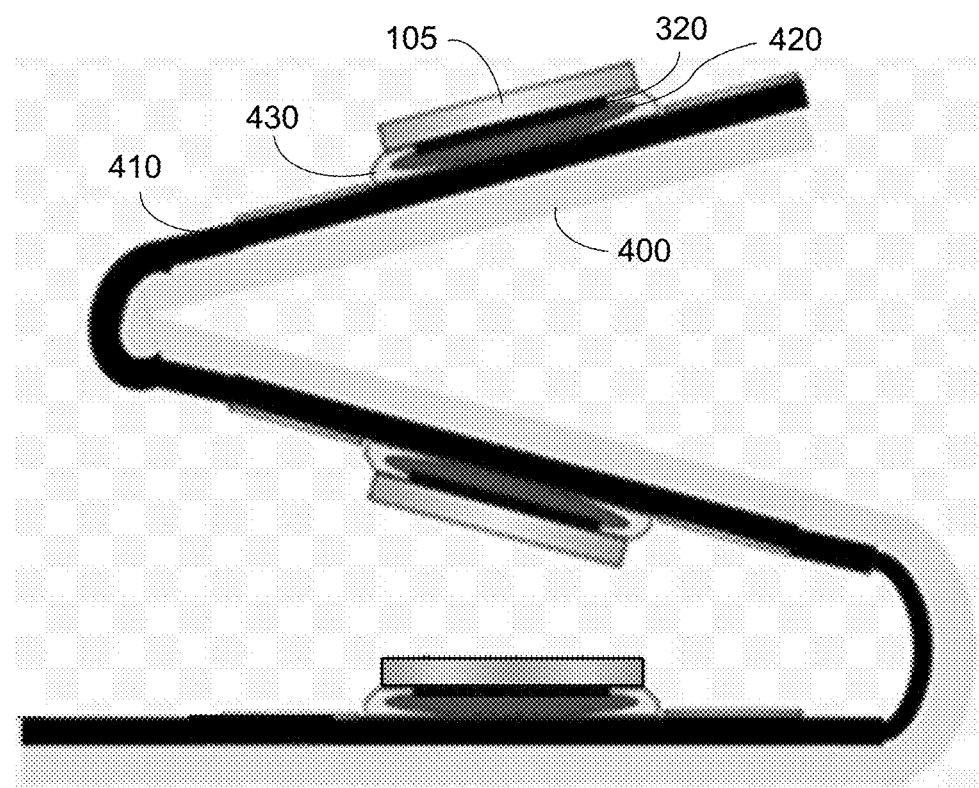
FIGS. 14A-B are structures in another exemplary method of stacking solid-state batteries according to one or more embodiments of the present invention.

After placement of the battery dies 105 onto the flexible stacking substrate 400, the substrate 400 is folded so that the battery dies 105 are stacked one on top of another. In the example shown in FIG. 14A, adjacent dies 105 are alternatingly face-to-face and back-to-back. The substrate 400 may be folded manually or using automated equipment (e.g., a conventional "z-folder"). The copper trace 410 shown in FIG. 14A (a second, substantially identical trace is behind, but physically separate from, the trace 410) is similar or identical to the electrodes 410a-b shown in FIGS. 10A-C, and connects the battery cells on the dies 105 in parallel.

Figure 14B:
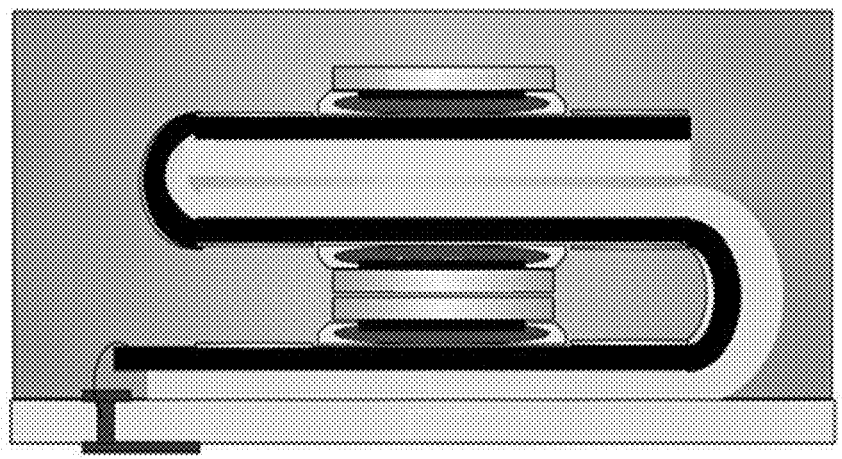

Referring to FIG. 14B, the final stacked package can be encapsulated by spraying or otherwise depositing a coating or other encapsulant on the entire folded stack to minimize ingress of air or moisture that could degrade the long-term performance of the battery. For example, the encapsulation can be deposited by ALD (e.g., for an alumina encapsulant), CVD (e.g., for a parylene encapsulant), injection molding or extrusion coating (e.g., for an organic thermoplastic polymer encapsulant).

In embodiments discussed above, the die 105 is generally rectangular or square when viewed from the top down. However, the die 105 may take a different shape for certain (e.g., customized) applications. Such shapes include, but are not limited to, trapezoidal, circular, curved, triangular, and irregular. Arbitrary die shapes can be achieved through dicing (e.g., by wet chemical etching or laser cutting). Stacking is done in a fashion similar to that described above. However, the final assembly after stacking can include a straight and/or vertical stack of battery dies 105.

In some embodiments, and referring now to FIG. 15A, the cathode and anode current collectors 210 and 240, respectively, are ablated in increasing amounts in the stacking order (i.e., the higher in the stack from the metal foil 114, the more of the current collector and substrate 114 are ablated). The current collectors 210 and 240 are connected in parallel by aerosol jet spray bonding, as described herein.

After die thinning and dicing (e.g., to form thinned, singulated foil substrates 114 as shown in FIG. 15B), both current collectors 210 and 240 are ablated on all but one die in the stack to facilitate vertical stacking of the die 105. The area that is ablated increases in increasing order in the stack. For example, if unablated die 105a is the lowermost die in the stack, then the current collectors 210 and 240 in the next/second lowermost die 105b in the stack are ablated by the smallest amount (e.g., x, where x is 5-20 μm, for example) in the width dimension. Alternatively, the current collectors 210 and 240 in die 105b can be ablated by 5-10% of the width of the die 105, but the invention is not so limited. Successive die 105c and 105d in the stack can be ablated by successive integer multiples of x (e.g., 2x, 3x, etc.) or of the percentage by which the die 105 was ablated, until the uppermost die in the stack is ablated by the largest amount. Stacking is then performed substantially as described herein, except that the dies 105a-d are not offset from each other.

Electrical connections 340 from each bond pad (e.g., 210) to the base frame or lead frame 300 are made using aerosol jet spraying or printing, as described herein, to connect the battery cells on the dies 105a-d in parallel. To facilitate good electrical connection, separate bond pads can be formed on the exposed portions of the cathode and anode current collectors 210 and 240. The separate bond pads may comprise gold, palladium, platinum, nickel, tungsten, etc. When used for example to connect the lowermost current collector and electrical connection 340 to the interior contact 310 on the lead frame 300, a wire bond 360 may be conventionally formed from gold, silver, or copper wire. The electrical connection 340 may comprise a stretchable conductor or a serpentine structure to accommodate battery expansion and contraction during charging and discharging operations, as described herein.

CONCLUSION

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A solid-state battery, comprising:
   a) a base frame or support;
   b) first and second exterior contacts on the base frame or support;
   c) a plurality of stacked solid-state battery unit cells, each on a unique corresponding metal foil substrate, the unique corresponding metal foil substrate having a thickness of 5-100 µm, and each of the plurality of stacked solid-state battery unit cells having an exposed cathode current collector and an exposed anode current collector;
   d) first and second electrical connections, on or along external sidewalls of the solid-state battery unit cells and the unique corresponding metal foil substrates, respectively electrically connecting the exposed cathode current collectors and the exposed anode current collectors to the first and second exterior contacts; and
   e) encapsulation in contact with the base frame or support and covering the plurality of solid-state battery unit cells and the first and second electrical connections.

2. The battery of claim 1, further comprising sidewall insulation between each of the first and second electrical connections and the plurality of solid-state battery unit cells, including the metal foil substrates.

3. The battery of claim 1, wherein each of the first and second electrical connections comprises a stretchable conductive material or a serpentine conductive structure.

4. The battery of claim 1, wherein each of the plurality of solid-state battery unit cells is offset from the other solid-state battery unit cells.

5. The battery of claim 1, wherein the plurality of solid-state battery unit cells is vertically stacked without offset.

6. The battery of claim 5, wherein:
   a lowermost one of the plurality of solid-state battery unit cells is electrically connected to the first and second exterior contacts,
   a next lowermost one of the plurality of solid-state battery unit cells includes a first cutout along an edge of the corresponding exposed cathode current collector and a second cutout along an edge of the corresponding exposed anode current collector, and
   the first and second electrical connections are respectively in the first and second cutouts.

7. The battery of claim 1, further comprising:
   a) a flexible stacking substrate to which the plurality of solid-state battery unit cells, including the metal foil substrates, are affixed or secured; and
   b) first and second electrodes on the flexible stacking substrate, wherein each of the exposed cathode current collectors is in ohmic contact with the first electrode, and each of the exposed anode current collectors is in ohmic contact with the second electrode.

8. The battery of claim 7, wherein the flexible stacking substrate is folded onto itself in the stacked plurality of solid-state battery unit cells, and adjacent ones of the plurality of solid-state battery unit cells are face-to-face or back-to-back.

9. The battery of claim 1, further comprising:
   a) first and second interior contacts on a same major surface of the base frame or support as the plurality of solid-state battery unit cells; and
   b) first and second through-vias respectively electrically connecting the first and second interior contacts to the first and second exterior contacts.

10. The battery of claim 1, wherein each of the plurality of solid-state battery unit cells comprises:
    a) a cathode current collector layer, on the respective metal foil substrate and continuous with the exposed cathode current collector;
    b) a cathode, on or over the cathode current collector;
    c) a solid-phase electrolyte, on or over the respective cathode; and
    d) an anode current collector layer, on or over the respective electrolyte and continuous with the exposed anode current collector.

11. The battery of claim 10, wherein each of the plurality of solid-state battery unit cells comprises an encapsulation layer over the anode current collector layer.

12. The battery of claim 1, wherein each of the metal foil substrates comprises steel, copper, aluminum, nickel, inconel, brass, molybdenum or titanium.

13. The battery of claim 12, wherein each of the metal foil substrates comprises a barrier on a major surface thereof, and the barrier is configured to inhibit or prevent diffusion of metal atoms from the metal foil substrate into one or more layers of the battery unit cells.

14. The battery of claim 13, wherein the barrier comprises silicon dioxide, aluminum oxide, silicon nitride, a silicon oxynitride, an aluminum oxynitride, a silicon aluminum oxynitride, aluminum nitride, titanium nitride, titanium aluminum nitride, or tungsten nitride.

15. The battery of claim 14, wherein the barrier has a total thickness of 0.5-3 μm.

16. The battery of claim 1, wherein each of the metal foil substrates has a minimum thickness of 10 μm.

17. The battery of claim 1, wherein each of the plurality of stacked solid-state battery unit cells comprises an individual die, and each individual die comprises one of the solid-state battery unit cells on a corresponding singulated metal foil substrate.

18. The battery of claim 17, wherein a number of the corresponding singulated metal foil substrates equals a number of the solid-state battery unit cells.

19. The battery of claim 1, wherein each of the metal foil substrates comprises stainless steel.

20. The battery of claim 10, wherein:
   a) the cathode current collector comprises gold, silver, copper, platinum, aluminum, or a conductive alloy thereof;
   b) the cathode comprises a lithium metal oxide or a lithium metal phosphate;
   c) the solid-state electrolyte comprises a lithium phosphorus oxynitride, a lithium borosilicate, a lithium vanadosilicate, a lithium aluminum/titanium phosphate, or lithium lanthanum zirconium oxide; and
   d) the anode current collector comprises nickel, zinc, copper, aluminum, or graphite.

* * * * *